United States Patent [19]

Inoue et al.

[11] Patent Number: 4,906,526

[45] Date of Patent: Mar. 6, 1990

[54] THERMOPLASTIC RESIN FILM HAVING IMPROVED PRINTABILITY

[75] Inventors: Masayuki Inoue; Akira Okamoto; Koichi Asami, all of Ibaraki; Kazuhide Hayama; Kanji Narazaki, both of Mie, all of Japan

[73] Assignee: Oji Yuka Goseishi Co., Ltd., Tokyo, Japan

[21] Appl. No.: 278,244

[22] Filed: Nov. 30, 1988

[30] Foreign Application Priority Data

Nov. 30, 1987 [JP] Japan ............................... 62-302592

[51] Int. Cl.$^4$ ....................... B32B 27/00; B32B 27/06; B32B 27/10

[52] U.S. Cl. .............................. 428/473.5; 428/476.3; 428/516; 428/523

[58] Field of Search .................. 428/516, 476.3, 473.5, 428/523

[56] References Cited

U.S. PATENT DOCUMENTS

| | | | |
|---|---|---|---|
| 4,420,530 | 12/1983 | Toyoda et al. . | |
| 4,663,216 | 5/1987 | Toyoda et al. . | |
| 4,725,492 | 2/1988 | Yazaki et al. .................... | 428/423.5 |

FOREIGN PATENT DOCUMENTS

| | | |
|---|---|---|
| 40-12302 | 6/1965 | Japan . |
| 53-6676 | 3/1978 | Japan . |
| 57-149363 | 9/1982 | Japan . |

*Primary Examiner*—George F. Lesmes

*Assistant Examiner*—Elizabeth M. Cole

*Attorney, Agent, or Firm*—Oblon, Spivak, McClelland, Maier & Neustadt

[57] ABSTRACT

A thermoplastic resin film having improved printability is described, which is formed by coating a polyolefin film with an aqueous solution containing a modified polyethylene-imine represented by the following general formula:

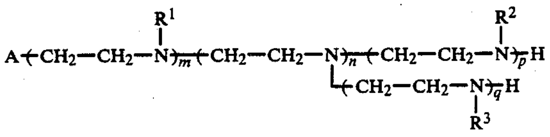

where A is

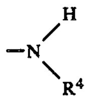

or a polyamine-polyamide residue; $R_1$-$R^4$ are each independently H, an alkyl or alkenyl group having 1-24 carbon atoms, an alicyclic hydrocarbon group or a benzyl group, provided that at least one of $R^1$-$R^4$ is a group other than H; m is 0-300; and n, p and q are each a number of 1-300, and drying the coated solution to form a surface coating.

12 Claims, No Drawings

THERMOPLASTIC RESIN FILM HAVING IMPROVED PRINTABILITY

BACKGROUND OF THE INVENTION

The present invention relates to a thermoplastic resin film having improved printability. More improved in ink transfer and adhesion that comprises a polyolefin film which has formed thereon a coating containing a specified compound.

The thermoplastic resin film, in particular, synthetic paper provided by the present invention is useful as the base paper of stickers for outdoor advertisement, labels on frozen food containers and namers on industrial products (i.e., labels describing their use and precautions that should be exercised).

Stickers for outdoor advertisement and labels to be attached to frozen food containers have conventionally been made of coated paper made of pulp fibre. However, coated paper is rather poor in water resistance and in order to compensate for this defect, attempts have recently been made to laminate its surface with polyester films. More recently, synthetic paper made of polyolefin having better resistance to water has gained increasing attention as a promising substitute for such coated paper. However, because of the non-polarity and hydrophobicity of the polyolefin from which it is made, such new synthetic paper is not completely satisfactory in terms of adaptability for offset printing and processability and is normally used after it has been given an appropriate surface treatment, for example, application of a coating agent to the surface of the paper. It is already known to use polyethylene-imine or an ethyleneimine/ethylene urea copolymer as such coating agent or anchor coating agent [see JP-B-40-12302, JP-B-53-6676 and JP-A-57-149363 (the terms "JP-A" and "JP-B" as used herein respectively mean an "unexamined published Japanese application" and an "examined Japanese patent publication")].

The method of surface treatment which uses polyethylene-imine as an anchor coating agent is capable of producing a film that has satisfactory printability for practical purposes if the film is a fresh one which has just been treated. However, if the resin film is stored either under hot conditions or for a period as long as one year before printing, insufficient ink transfer or ink adhesion that is too low to warrant practical use will sometimes take place during printing operations, in particular, those of printing with UV radiation curable ink (which is hereunder referred to as UV curable ink) or offset printing ink.

SUMMARY OF THE INVENTION

The present inventors conducted various studies in order to solve these problems with the prior art. As a result, the present inventors found that when a thermoplastic resin film, in particular, polyolefinic synthetic paper, was coated with a coating agent containing a specified type of modified polyethylene-imine that was subsequently dried to form a surface coating, the resin film or synthetic paper would retain good ink transfer and adhesion during printing with UV curable ink even after it has been exposed to high temperatures or stored for a prolonged period before printing. The present invention has been accomplished on the basis of this finding.

The present invention provides a thermoplastic resin film having improved printability which is formed by coating a polyolefin film with aqueous solution containing a modified polyethylene-imine represented by the following general formula:

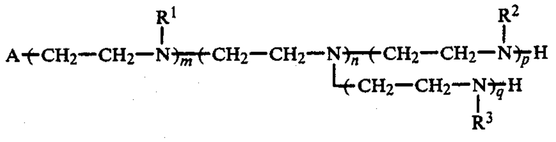

(where A is

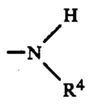

or a polyamine-polyamide residue; $R^1$–$R^4$ are each independently H, an alkyl or alkenyl group having 1–24 carbon atoms, an alicyclic hydrocarbon group or a benzyl group, provided that at least one of $R^1$–$R^4$ is a group other than H; m is 0–300; and n, p and q are each a number of 1–300), and drying the coated solution to form a surface coating.

The thermoplastic resin film of the present invention has improved printability, in particular, good ink transfer and adhesion and is formed by coating a polyolefin film with an aqueous solution containing a modified polyethylene-imine represented by the general formula shown above, then drying the coated solution to form a surface coating.

DETAILED DESCRIPTION OF THE INVENTION

Polyolefin film

The polyolefin film to be coated which is to be used in producing the thermoplastic resin film of the present invention is selected from among the films of such polyolefins as polypropylene, polyethylene and propyleneethylene copolymers. A particularly preferred example is synthetic paper having on its surface a polyolefin film containing fine inorganic particles. Such synthetic paper is known and for details thereof, reference may be had to such prior patents as JP-B-46-40794 and JP-B-49-1782, as well as JP-A-56-118437, JP-A-57-12642 and JP-A-57-56224.

Prior art synthetic papers that have proved to be most successful include: a polyolefin film containing fine inorganic particles (e.g. calcined clay and calcium carbonate) is stretched uniaxially to form a surface layer that has a large number of cracks formed around the fine inorganic particles; and multi-layered synthetic paper having a polyolefin film layer that is substantially free of a surface layer containing fine inorganic particles [see Japanese Patent Application Nos. 124882/84 and 121897/85 (corresponding to JP-A-61-3748 and JP-A-61-279543, respectively)].

Such synthetic papers may be subjected to a corona discharge treatment or some other suitable surface treatment before a coating agent is applied to their surface.

Coating agent (1) Modified polyethylene-imine [component (A)]

Modified polyethylene-imine component (A) is used as an essential component of a coating agent applied for the thermoplastic resin film of the present invention is prepared by modifying polyethylene-imine or a polyethylene-imine adduct of polyamine polyamide with a halogenated alkyl having 1-24 carbon atoms, a halogenated alkenyl, a halogenated cycloalkyl or a halogenated benzyl.

Specific examples of halides that are used as modifiers include methyl chloride, ethyl bromide, n-butyl chloride, lauryl chloride, stearyl iodide, oleyl chloride, cyclohexyl chloride, benzyl chloride, allyl chloride and cyclopentyl chloride.

The polyethylene-imine may have any degree of polymerization so long as the intended advantages of the present invention can be attained but it is normally within the range of 200–3,000.

The polyethylene-imine adduct of polyamine polyamide is prepared by adding ethylene-imine to the polyamine polyamide which is the reaction product of a polyalkylene polyamine such as ethylenediamine, diethylenetriamine or triethylenetetramine with a dibasic acid such as adipic acid, glutaric acid or succinic acid. The polyamine polyamide may have any molecular weight, preferably in the range of 500–20,000. The ethyleneimine to be added may also have any degree of polymerization, which is preferably within the range of 20–3,000.

The above-described polyethylene-imine or polyethylene-imine adduct of polyamine polyamide may be modified as follows: one of the halides listed above as modifiers is added to the polymer to be modified and the mixture is heated with stirring at 50°-200° C., preferably 80°-120° C., for 5-30 hours, optionally in the presence of water and/or a hydrophilic solvent. Specific examples of the hydrophilic solvent include alcohols such as ethyl alcohol and isopropyl alcohol, glycols such as ethylene glycol and propylene glycol, and cellosolves such as ethylene glycol monoethyl ether and ethylene glycol monoethyl ether acetate, all of these solvents having a water solubility of at least 10 g/100 g $H_2O$.

Preferred examples of the modified polyethylene-imine include n-butyl modified polyethylene-imine, cyclopentyl modified polyethylene-imine and allyl modified polyethylene-imine.

An aqueous solution of the modified polyethylene-imine described above may contain other components such as an antistatic agent and a drying accelerator.

(2) Antistatic agent [component (B)]

An antistatic is used as an optional component in the present invention and is a water-soluble tertiary or quaternary nitrogen-containing acrylic polymer. The term "quaternary" as used herein encompasses the term "atmospheric".

Such nitrogen-containing polymers can be prepared by polymerizing the corresponding nitrogen-containing monomer and, if desired, by quaternizing the resulting tertiary nitrogen-containing polymer.

Typical examples of such nitrogen-containing monomers suitable for use in the present invention are as follows.

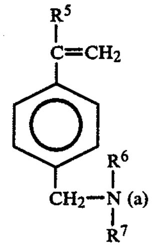 (a)
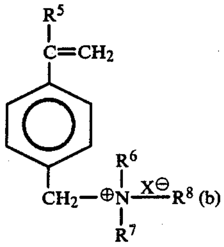 (b)

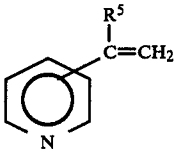 (c)
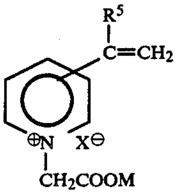 (d)

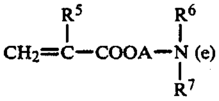 (e)

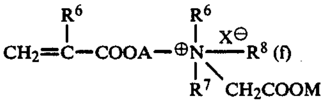

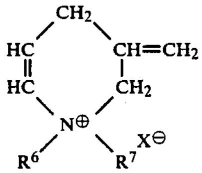 (g)

In the above formulae: $R^5$ stands for hydrogen or a methyl group; each of $R^6$ and $R^7$ stands for a lower alkyl group (especially one having 1–4 carbon atoms, preferably 1 or 2 carbon atoms); $R^8$ stands for a saturated or unsaturated alkyl group or cycloalkyl group having 1 to 22 carbon atoms; $X^{\ominus}$ stands for a counter anion of a quaternized $N^{\oplus}$(e.g., halide (especially chloride) ions); M stands for an alkali metal ion (especially sodium, potassium or lithium ion); and A stands for an alkylene group having 2 to 6 carbon atoms. The quaternary nitrogen-containing monomers (b), (d) and (f) can, of course, also be incorporated into the polymer by polymerizing their precursor monomers ((a), (c) and (e)) and then quaternizing the resulting polymer with a cationizing agent such as an alkyl halide, dimethyl sulphate, or a monochloroacetic acid ester. The salt (MX) formed of the alkali metal ion (M) and counter anion (X) may be removed, as required, by such techniques as filtration and ion-exchange.

The antistatic agent to be used in the present invention must be water soluble, but it is not desired that it is excessively water-soluble. Thus, it is desirable that the tertiary or quaternary nitrogen-containing polymer is a copolymer with a hydrophobic monomer. Suitable hydrophobic monomers are, for example, styrene, a nucleus- or side chain-substituted styrene, an acrylate or methacrylate, a vinyl halide, and the like.

The antistatic agent polymer especially suitable for use in the present invention is a copolymer obtained by copolymerizing the following components (i), (ii) and (iii):

(i) a monomer selected from 20 to 40 by weight, (a) through (g) above

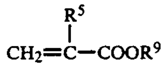

6 to 80% by weight, (ii)

(wherein $R^5$ is hydrogen or a methyl group; and $R^9$ is an alkyl group having 1–24 carbon atoms, an alkylene group or a cycloalkyl group)

(iii) another hydrophobic 0 to 20% by weight vinyl monomer

The antistatic agent polymer which is most suitable for use in the present invention is a polymer wherein the monomer (i) is the above-mentioned monomer (f) wherein the $X^{\ominus}$is $Cl^{63}$.

(3) Polyamine polyamide-epichlorohydrin adduct [Component (C)]

The Component (C) is a water-soluble cationic thermosetting resin obtained by the reaction of a polyamide produced from a saturated dibasic carboxylic acid having 3 to 10 carbon atoms and a polyalkylenepolyamined with epichlorohydrin. This resin is described in detail in JP-B-35-3547.

The saturated dibasic carboxylic acid having 3 to 10 carbon atoms is exemplified by a dicarboxylic acid having 4 to 8 carbon atoms, especially adipic acid. The polyalkylenepolyamine is exemplified by a polyethylenepolyamine, especially by ethylenediamine, diethylenetriamine and triethylenetetramine (preferably by diethylenetriamine).

(4) Another optional component [Component (D)]

The coating agent used in the present invention contains the above-described component (A) as an essential ingredient. It may further contain the above-described components (B) and (C), and even another optional component (D) as long as the intended advantages of the present invention are achieved.

Such an optional component (D) is exemplified by a water-soluble inorganic salt. When the present coating agent contains such an inorganic salt, the antistatic effect of the above-mentioned antistatic agent is enhanced and also the drying speed of an off-set ink printed thereon is increased. The presence of the water-soluble inorganic salt, however, lowers the water-resistant adhesiveness of the ink. The presence of an excessively larger amount of the salt is not desirable.

Examples of preferred water-soluble inorganic salts are alkaline salts such as sodium carbonate, potassium carbonate, sodium hydrogen carbonate and sodium sulfite, as well as neutral salts such as sodium chloride, sodium sulfate and sodium nitrate.

Besides such water-soluble inorganic salts, the coating agent for use in the present invention can contain a water-soluble organic solvent, a surface active agent, a water-soluble polymer, fine powder materials and other auxiliary materials.

(5) Mixing ratio between components

A hundred parts by weight of the essential component (A) is preferably mixed in the following ratio with optional components (B), (C) and (D) which are taken either independently or as admixtures.

| Components | Parts by weight |
|---|---|
| (A) | 100 |
| (B) | 10–800, preferably 20–600 |
| (C) | 50–300, preferably 60–180 |
| (D) | 20–100, preferably 40–80 |

(6) Form of the coating agent

The coating agent which is made of a water-soluble resin composition containing component (A), and optionally component (B), (C) or (D), is normally in the form of an aqueous solution. The concentration of the aqueous solution is usually in the range of from about 0.5 to 3 wt %.

Formation of a surface coating

The coating agent made of a water-soluble resin composition containing component (A) is applied onto a polyolefin film, then dried to form a surface coating of the modified polyethylene-imine on the polyolefin film. This coating agent can be applied by roll coating, blade coating, air-knife coating, size pressing or any other standard coating method.

The following examples and comparative examples are provided for the purpose of further illustrating the present invention but are in no way to be taken as limiting. The thermoplastic resin films used in the examples and the comparative examples, as well as the components incorporated in the coating agents applied to those resin films are as follows.

Thermoplastic resin films

P-1:

(1) Polypropylene having a melt index (MI) of 0.8 (m.p. 164° C.) was mixed with 12 wt. % (based on the total weight including the polypropylene) of ground calcium carbonate having an average particle size of 1.5 μm. The resulting composition (C') was kneaded in an extruder set at 270° C. and extruded into a sheet, which was cooled with a cooling apparatus to obtain an unstretched sheet. This sheet was heated to 140° C. and thereafter stretched 5 times the original length in the machine direction.

(2) Forty-nine wt. % of polypropylene (MI, 4.0) was mixed with 5 wt. % of maleic acid (modifying monomer) modified polypropylene having a maleic acid unit content of 0.5 wt. % and with 46 wt. % of calcium carbonate having an average particle size of 1.5 μm, so as to form composition (A') (containing 0.05 parts by weight of the modifying monomer per 100 parts by weight of filler material). This composition (A') was melt-kneaded in an extruder set at 270° C. Composition (B') consisting of a mixture of 55 wt. % of polypropylene (MI, 4.0) and 45 wt. % of ground calcium carbonate having an average particle size of 1.5 μm was also melt-kneaded in a separate extruder set at 270° C. The two melts were laminated in a die and coextruded onto both sides of the drawn sheet [as stretched 5 times the original length in the machine direction in step (1)] in such a way that the layer containing the modified polypropylene would form the outermost layer, thereby producing a 5-ply laminate (A'/B'/C'/B'/A').

This 5-ply laminate was heated to 155° C., then stretched 7.5 times the initial length in the transverse direction to obtain a 5-ply laminated film (20/5/50/5/20 μm in thickness).

P-2:

(1) Composition (C') incorporating 79 wt. % of polypropylene (MI, 0.8), 5 wt. % of high-density polyethylene and 16 wt. % of calcium carbonate (average particle size, 1.5 μm) was kneaded in an extruder set at 270° C. and thereafter extruded into a sheet, which was cooled with a cooling apparatus to obtain an unstretched sheet. This sheet was heated to 140° C. and thereafter stretched 5 times the original length in the machine direction.

(2) Polypropylene (A') having a melt index (MI) of 4.0 and composition (B') consisting of a mixture of 55 wt. % of polypropylene (MI, 4.0) and 45 wt. % of calcium carbonate having an average particle size of 1.5 μm were melt-kneaded in different extruders set at 270° C., laminated in a die and coextruded onto both sides of the 5-fold stretched sheet prepared in step (1) in such a way that (A') would form the outermost layer. The resulting laminated sheet was cooled to 60° C., heated to ca. 160° C., stretched 7.5 times the initial length in the transverse direction with a tenter, annealed at 165° C., cooled to 60° C. and had its edges cut off to produce a 5-ply synthetic paper (A'/B'/C'/B'/A' having the respective thicknesses of 30/3/64/3/30 μm).

Component (A), Modified polyethylene-imine

AM-1:

A four-necked flask equipped with a stirrer, a reflux condenser, a thermometer and a nitrogen-gas introducing port was charged with 100 parts of a 25 wt. % aqueous solution of ethylene-imine adduct of polyamine polyamide ("Polymin SN" of BASF A.G.), 10 parts of n-butyl chloride and 10 parts of isopropyl alcohol, and a modification reaction was performed at 80° C. for 20 hours with stirring in a nitrogen stream. The resulting aqueous solution was designated AM-1.

EI-1:

A flask of the same type as employed in the preparation of AM-1 was charged with 100 parts of a 30 wt. % aqueous solution of ethylene-imine ("P-1000" of Nippon Shokubai Kagaku Kogyo Co., Ltd.), 15 parts of n-butyl chloride and 20 parts of ethylene glycol monobutyl ether, and a modification reaction was performed at 80° C. for 25 hours with stirring in a nitrogen stream. The resulting aqueous solution was designated EI-1.

EI-2:

The procedures for the preparation of EI-1 were repeated except that the amount of n-butyl chloride used was reduced to 5 parts. The resulting aqueous solution was designated EI-2.

EI-3:

A flask of the same type as employed in the preparation of AM-1 was charged with 100 parts of a 30 wt. % aqueous solution of ethylene-imine ("P-1000" of Nippon Shokubai Kagaku Kogyo Co., Ltd.), 30 parts of lauryl chloride and 20 parts of ethylene glycol monoethyl ether, and a modification reaction was performed at 130° C. for 20 hours with stirring in a nitrogen stream. The resulting aqueous solution was designated EI-3.

EI-4:

The procedures for the preparation of EI-1 were repeated except that 15 parts of n-butyl chloride was replaced by 20 parts of benzyl chloride. The resulting aqueous solution was designated EI-4.

EI-5:

The procedures for the preparation of EI-1 were repeated except that 15 parts of n-butyl chloride was replaced by 13 parts of allyl chloride. The resulting aqueous solution was designated EI-5.

EI-6:

The procedures for the preparation of EI-1 were repeated except that 15 parts of n-butyl chloride was replaced by 18 parts of cyclopentyl chloride. The resulting aqueous solution was designated EI-6.

AM-0:

"Polymin SN" of BASF A.G. (precursor of AM-1)

EI-0:

"P-1000" of Nippon Shokubai Kagaku Kogyo Co., Ltd. (precursor of EI-1)

Component (B), Antistatic agent

B-1:

"Saftomer ST-1000" of Mitsubishi Petrochemical Company Ltd.

B-2:

"Saftomer ST-1100" of Mitsubishi Petrochemical Company Ltd.,

These are amphoteric acrylic copolymers containing as the building block the quaternary nitrogen-containing monomer (f) described herein.

Component (C), Epichlorohydrin adduct of polyamine polyamide

C-1: "Arafix 100" of Arakawa Kagaku Kogyo K.K.

C-2: "Kymene 557H" of DIC Hercules K.K.

Component (D), Another optional component

D-1: Sodium carbonate (reagent grade)

D-2: Potassium chloride (reagent grade)

EXAMPLE 1

A coating solution was prepared by weighing the necessary components and water in such a way that the effective amounts of the respective components (i.e., the amounts of the evaporation residue) would fall within the recipe shown below per 100 parts by weight of the coating solution, and thereafter thoroughly stirring the mixture:

| | | | |
|---|---|---|---|
| Component (A) | : | EI-1 | 0.6 part by weight |
| Component (B) | : | B-1 | 0.4 part by weight |
| Component (C) | : | C-1 | 0.7 part by weight |
| Component (D) | : | D-1 | 0.1 part by weight |

After being subjected to a corona discharge treatment, both surfaces of the thermoplastic resin film (P-1) were roll-coated with the coating solution in a quantity of 0.06 $g/m^2$ per side in terms of the amount of evaporation residue. The applied solution was dried at 65° C. to form a surface coating and the film web was wound on a take-up roll.

Printing was done on the resulting film with a UV curable ink and the ink transfer and adhesion were evaluated. The results are shown in Table 1, from which one can see that the film performed satisfactorily for practical purposes even when it was heated or left to stand for a year before printing.

the adhesion and transfer of the UV curable ink were evaluated by the following methods.

Ink adhesion

The polypropylene sheet coated with the coating agent was given a deposit of a UV curable ink ("Best Cure-161" of Toka Shikiso Chemical Industries Co., Ltd.) in an amount of ca. 3 g/m$^2$ with an RI tester (Akari Seisakusho K.K.). The deposited ink was dried by allowing the sheets to pass 10 times through a zone 10 cm beneath a high-pressure mercury lamp (80 W/cm) at a rate of 25 m/min. An adhesive tape ("Cellotape LP-24" of Nichiban Co., Ltd.) was attached to the dried ink layer on each sheet and a ball of gauze was lightly rubbed against the tape. Thereafter, the tape was quickly pulled in order to evaluate the adhesion of the ink to the sheets. Thereafter, the tape was quickly pulled in order to evaluate the adhesion of the ink to the sheets. The results were evaluated by the following criteria:

| | | |
|---|---|---|
| ○: | 0–5% of the transferred ink separated | acceptable for practical purposes |
| ◎: | 5–25% of the transferred ink separated | acceptable for practical purposes |
| Δ: | 25–50% of the transferred ink separated | acceptable for practical purposes |
| ✱: | 50–100% of the transferred ink separated | |
| X: | the transferred ink separated even when the tape was slowly pulled | |

Ink Transfer

"Best Cure-161" (black) was deposited with an RI tester on films coated with the coating agent in a typical amount of 1.5 g/m$^2$. The printed surface in ink was visually inspected for defecting ink transfer as would be evidenced by streaks in the coating or white specks.

| | | |
|---|---|---|
| ○: | no problem at all | acceptable for practical purposes |
| ◎: | some visible streaks in the coating | acceptable for practical purposes |
| Δ: | the color transferred ink was so pale that streaks in the coating were visible | acceptable for practical purposes |
| ✱: | the color of the transferred ink was much paler to product visible specks | |
| X: | ink transfer was almost unsuccessful | |

Evaluation after heating

The same tests were conducted after the film samples had been exposed to hot (65° C.) air for 4 days in order to evaluate the change that might occur during storage under hot conditions. The results are shown in Table 1 under the heading "after heating".

Evaluation after accelerated aging

The same tests were conducted after the film samples had been left to stand at 50° C. for a month in order to evaluate the change that might occur during prolonged storage. The results are shown in Table 2 under the heading "after accelerated aging".

EXAMPLE 2

A thermoplastic resin film was produced as in Example 1 except that the optional component (C) was not incorporated in the aqueous solution of coating agent. The performance of this film in terms of ink adhesion and transfer was evaluated and the results are shown in Table 1.

TABLE 1

| | Ink adhesion | | | Ink transfer | | |
|---|---|---|---|---|---|---|
| | fresh | after standing for 1 yr | after heating | fresh | after standing for 1 yr | after heating |
| Example 1 | ◎ | Δ | Δ | ○ | ○ | ○ |
| Example 2 | ◎ | Δ | Δ | ○ | Δ | Δ |
| Comparitive Example 1 | ◎ | X | X | ○ | ◎ | X |
| Comparative Example 2 | ◎ | X | X | ○ | Δ | X |

Comparative Examples 1 and 2

Thermoplastic resin films were produced as in Examples 1 and 2 except that the modified polyethyleneimine was replaced by its precursor, "P-1000" of Nippon Shokubai Kagaku Kogyo Co., Ltd. The performance of these thermoplastic resin films in terms of ink adhesion and transfer was evaluated and the results are shown in Table 1.

EXAMPLE 3

A coating solution was prepared by weighing the necessary components and water in such a way that the effective amounts of the respective components (i.e., the amounts of evaporation residue) would fall within the recipe shown below per 100 parts by weight of the coating solution, and thereafter thoroughly stirring the mixture:

| | | | |
|---|---|---|---|
| Component (A) | : | AM-1 | 0.6 part by weight |
| Component (B) | : | B-2 | 0.4 part by weight |
| Component (C) | : | C-2 | 0.4 part by weight |
| Component (D) | : | D-1 | 0.1 part by weight |

After being subjected to a corona discharge treatment, both surfaces of the thermoplastic resin film (P-2) were roll-coated with the coating solution in a quantity of 0.04 g/m$^2$ per side in terms of the amount of evaporation residue. The applied solution was dried at 60° C. to form a surface coating and the film web was wound on a take-up roll.

Using a UV curable offset printing ink ("FD-O-G" of Toyo Ink Mfg. Co., Ltd.), 4-color (black, blue, red and yellow) offset printing was performed on the thermoplastic resin films with a 4-color offset printing press manufactured by Komori Printing Machinery Co., Ltd. Evaluations were made with respect to ink transfer, ink adhesion, and adaptability for offset printing (sharpness of printed image). The results are shown in Table 2, from which one can see marked improvement in the performance after standing under accelerated conditions.

EXAMPLES 4–11

The coating agent compositions shown in Table 2 were prepared as in Example 3 and the thermoplastic resin films shown in Table 2 were treated as in Example 3 to produce coated films. The results of evaluation of these coated films are also shown in Table 2, from which one can see that these coated films, when used as films for printing with UV curable ink, performed satisfactorily for practical purposes.

COMPARATIVE EXAMPLES 3-6

The coating compositions shown in Table 2 were prepared as in Example 3 except that the modified polyethylene-imine was replaced by its precursor "Polymin SN" of BASF A.G. or "P-1000" of Nippon Shokubai Kagaku Kogyo Co., Ltd. The thermoplastic resin films shown in Table 2 were treated as in Example 3 to produce coated films. The results of evaluation of these coated films are shown in Table 2. As this table shows, the performance of these coated films was particularly poor after standing under accelerated conditions; streaks were visible through the transferred ink layer and, in addition, the poorly adhering ink layer readily separated even when the adhesive tape was slowly pulled.

TABLE 2

| | | Examples | | | | | | | | | Comparative Examples | | | |
|---|---|---|---|---|---|---|---|---|---|---|---|---|---|---|
| | | 3 | 4 | 5 | 6 | 7 | 8 | 9 | 10 | 11 | 3 | 4 | 5 | 6 |
| Conditions | | | | | | | | | | | | | | |
| Thermoplastic resin film | | P-2 | P-2 | P-2 | P-2 | P-2 | P-1 | P-1 | P-1 | P-1 | P-2 | P-2 | P-1 | P-1 |
| Coating agent | | | | | | | | | | | | | | |
| Coating agent Component (A) (parts by weight) | Type | AM-1 | EI-1 | EI-2 | EI-3 | EI-4 | EI-5 | EI-6 | AM-1 | AM-1 | AM-0 | EI-0 | AM-0 | AM-0 |
| | Amount | 0.4 | 0.3 | 0.3 | 0.3 | 0.3 | 0.3 | 0.3 | 0.4 | 2.0 | 0.4 | 0.3 | 0.3 | 2.0 |
| Component (B) (parts by weight) | Type | B-2 | B-2 | B-2 | B-2 | B-2 | B-2 | B-2 | B-2 | — | B-2 | B-2 | B-2 | — |
| | Amount | 0.6 | 0.6 | 1.0 | 0.6 | 1.0 | 1.0 | 0.6 | 0.6 | — | 0.6 | 0.6 | 0.6 | — |
| Component (C) (parts by weight) | Type | C-2 | C-2 | C-1 | C-1 | C-2 | C-2 | C-2 | C-1 | — | C-2 | C-1 | C-2 | — |
| | Amount | 0.4 | 0.4 | 0.3 | 0.4 | 0.5 | 0.4 | 0.4 | 0.4 | — | 0.4 | 0.4 | 0.4 | — |
| Component (D) (parts by weight) | Type | D-1 | D-1 | D-2 | D-1 | D-2 | D-1 | D-1 | D-1 | — | D-1 | D-2 | D-1 | — |
| | Amount | 0.1 | 0.1 | 0.1 | 0.2 | 0.1 | 0.1 | 0.1 | 0.1 | — | 0.1 | 0.2 | 0.1 | — |
| Result of evaluation | | | | | | | | | | | | | | |
| Adaptability for offset printing | | ○ | ○ | ○ | ○ | ○ | ○ | ○ | ○ | △ | ○ | ○ | ○ | X |
| Ink transfer | Fresh | ○ | ○ | ○ | ○ | ○ | ○ | ○ | ○ | ○ | ○ | ○ | ○ | ○ |
| | After accelerated aging | △ | ○△ | △ | ○△ | ○△ | ○△ | ○△ | △ | ○ | X | X | X△ | △ |
| Ink adhesion | Fresh | △ | ○ | △ | ○ | ○ | ○ | ○ | ○ | ○ | ○△ | ○△ | ○△ | ○ |
| | After accelerated aging | △ | ○△ | △ | △ | ○ | ○ | ○ | ○△ | ○ | X | X△ | X△ | ○△ |

The thermoplastic resin film of the present invention has a surface coating that is made of polyethylene-imine having a terminal group modified with the compound specified herein. Therefore, even if printing is performed on this film with a UV curable ink after strorage either at elevated temperatures or for a prolonged period, the film will experience only a very small amount of deterioration in ink transfer or adhesion. In other words, the thermoplastic resin film of the present invention can be stored for several years and yet it retains a sufficient degree of ink transfer and adhesion to withstand printing in commercial applications.

While the invention has been described in detail and with reference to specific embodiments thereof, it will be apparent to one skilled in the art that various changes and modifications can be made therein without departing from the spirit and scope thereof.

What is claimed is:

1. A thermoplastic resin film having improved printability which is formed by coating a polyolefin film with an aqueous solution containing a modified polyethylene-imine represented by the following general formula:

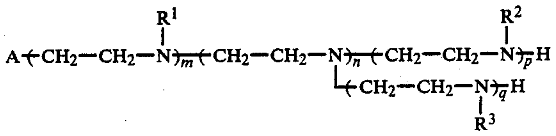

where A is

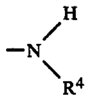

or a polyamine-polyamide residue; $R^1$-$R^4$ are each independently H, an alkyl or alkenyl group having 1-24 carbon atoms, an alicyclic hydrocarbon group or a benzyl group, provided that at least one of $R^1$-$R^4$ is a group other than H; m is 0-300; and n, p and q are each a number of 1-300, and drying the coated solution to form a surface coating.

2. A thermoplastic resin film according to claim 1, wherein the aqueous solution containing a modified polyethylene-imine further contains a water-soluble tertiary or quaternary nitrogen-containing acrylic polymer.

3. A thermoplastic resin film according to claim 2, wherein the water-soluble tertiary or quaternary nitrogen-containing acrylic polymer is present in an amount of 10-800 parts by weight per 100 parts by weight of the modified polyethylene-imine.

4. A thermoplastic resin film according to claim 3, wherein the water-soluble tertiary or quaternary nitrogen-containing acrylic polymer is present in an amount of 20-600 parts by weight per 100 parts by weight of the modified polyethylene-imine.

5. Thermoplastic resin film according to claim 2, wherein the aqueous solutions containing a modified polyethylene-imine and a water-soluble tertiary or quaternary nitrogen-containing acrylic polymer further contains a water-soluble inorganic salt.

6. A thermoplastic resin film according to claim 5, wherein the water soluble inorganic salt is present in an amount of 20–100 parts by weight per 100 parts by weight of the modified polyethylene-imine.

7. A thermoplastic resin film according to claim 6, wherein the water soluble inorganic salt is present in an amount of 40–80 parts by weight per 100 parts by weight of the modified polyethylene-imine.

8. A thermoplastic resin film according to claim 1, wherein the aqueous solution containing a modified polyethylene-imine further contains an epichlorohydrin adduct of polyamine polyamide.

9. A thermoplastic resin film according to claim 8, wherein the epichlorohydrin adduct of polyamine polyamide is present in an amount of 50–300 parts by weight per 100 parts by weight of modified polyethylene imine.

10. A thermoplastic resin film according to claim 9, wherein the epichlorohydrin adduct of polyamine polyamide is present in an amount of 60–80 parts per 100 parts by weight of the modified polyethylene imine.

11. A thermoplastic resin film according to claim 1, wherein the modified polyethylene-imine is selected from n-butyl modified polyethylene-imine, cyclopentyl modified polyethylene-imine and allyl modified polyethylene-imine.

12. A thermoplastic resin film according to claim 1, wherein the concentration of the aqueous solution is in the range of from 0.5 to 3 wt. %.

* * * * *